United States Patent Office 3,080,644
Patented Mar. 12, 1963

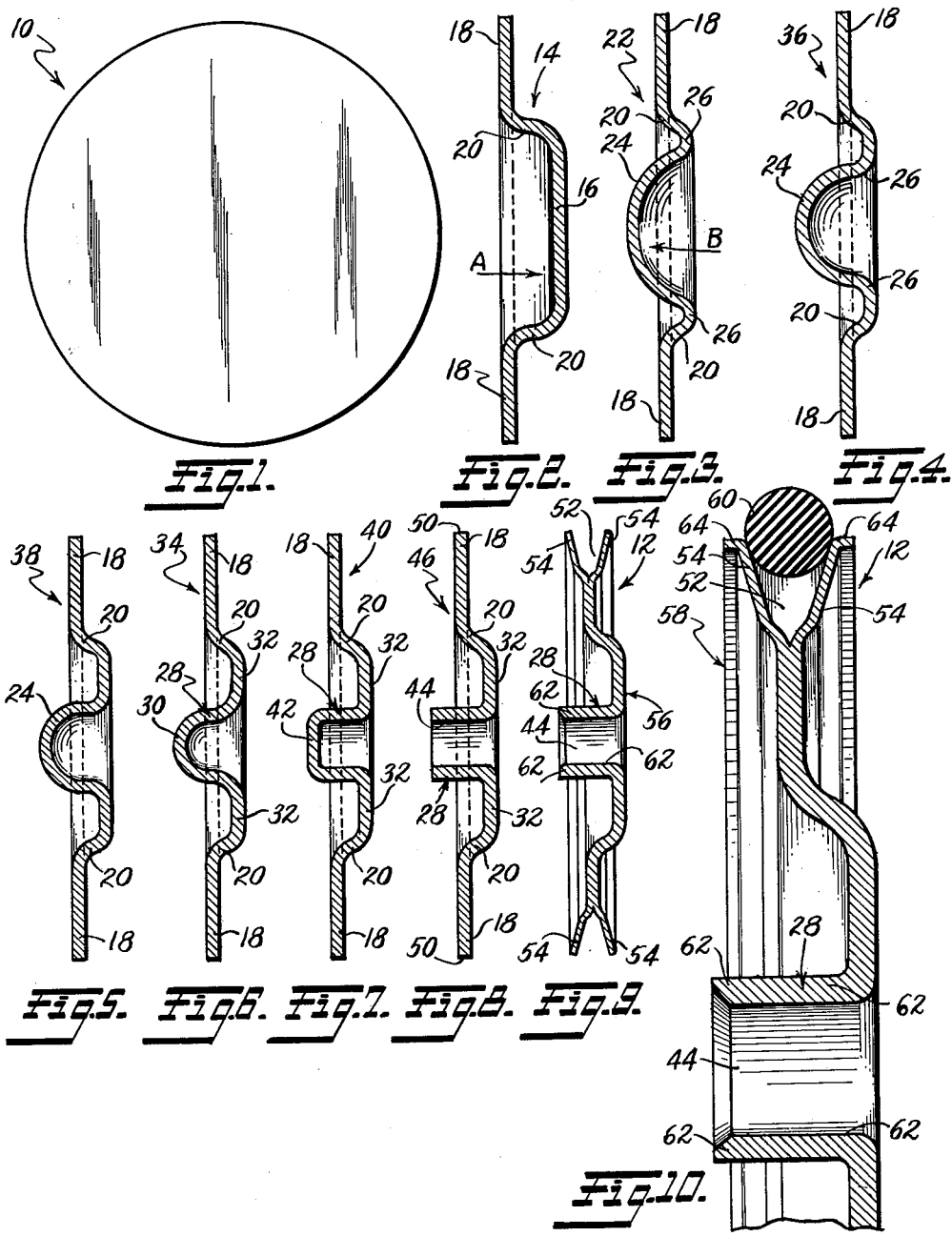

3,080,644
METHOD OF MAKING A WHEEL
Dominick L. Previte, Willowick, and Arthur D. Schultz, Lyndhurst, Ohio, assignors to Eaton Manufacturing Company, Cleveland, Ohio, a corporation of Ohio
Filed Sept. 12, 1958, Ser. No. 760,730
11 Claims. (Cl. 29—159)

This invention relates to a method of manufacturing wheels; and, deals more particularly with a method of fabricating a complete one-piece metallic wheel from a single unitary sheet metal blank by a series of successive metal forming operations.

In the past, a wide variety of methods have been used in the manufacture of light duty wheels from sheet metal stock, as by punching, spinning, drawing, bending, bulging and other conventional metal shaping operations. Many of the wheels made in accordance with these known methods of fabrication include a hub portion formed from a separate piece of material and which, therefore, necessitates costly assembly operations for securing the hub portion to the disc portion of the wheel. Or, if the hub portion is formed integral with the disc portion of the wheel, the wheel usually will either lack lateral stability or the hub portion thereof is extended an undue distance axially to one side of the peripheral portion of the finished wheel.

It is therefore the primary object of the present invention to provide an improved method of manufacturing a unitary wheel such as a pulley or wheel and tire assembly which overcome these and other disadvantages of the prior art.

Also, it is an object of this invention to provide an improved method of manufacturing a one-piece metal wheel, such as a pulley or wheel and tire assembly, having a generally axially extending hub which passes through a radial plane common to the peripheral portion of the wheel with the hub being provided with axially extending integral portions which are disposed substantially equally to each side of such plane in order to provide increased lateral stability and support for the wheel.

Another object of this invention is to provide an improved method of manufacturing a V-groove wheel, such as a pulley or wheel and tire assembly, wherein an improved hub structure, as stated above, is provided, and if desired, to further provide a V-groove portion for such wheel with generally axially extending flanges in order to increase the strength of the V-groove portion, increase the lateral stability of the wheel and increase the surface contact of the V-groove portion.

Also, it is an object of the present invention to provide an improved method for manufacturing an integral wheel having improved lateral stability from a single sheet metal blank by a related series of easily performed metal forming operations.

A further object of this invention is to provide an improved method for manufacturing a wheel from a unitary, disc-shaped, imperforate sheet metal blank whereby the dimensional accuracy of the hub bore thereof is improved by forming the opening therefore only after the metal forming operations are completed.

In order to accomplish the desired results, as stated above, in accordance with the present invention, an imperforate, unitary, flat, disc-like sheet metal blank is first drawn to provide a cup-shaped central portion having an imperforate base and a flange portion extending radially outwardly and axially offset in one direction therefrom. The radially inner part of the base of the cup-shaped central portion is then reverse drawn in the opposite direction and progressively additionally redrawn to provide a generally cylindrical hub having an imperforate closed end and a longitudinally extending annular wall which is disposed substantially equally to both sides of a radial plane common to the flange portion. After the drawing operations have been completed, the closed end of the hub is perforated to form a bore therethrough and the peripheral marginal edge of the flange portion is parted to form a V-shaped groove therein and to thereby complete the fabrication of the unitary or one-piece wheel which, may be used as a V-groove pulley or, if desired, an annular resilient tire may be secured in the V-groove to complete a wheel-tire assembly. Also, if desired, after the parting operation, generally axially extending flanges may be formed on the V-groove portion of the wheel by an operation such as rolling.

Other objects and important features of the invention will be apparent from a study of the specification following taken with the drawing, which together show and describe a preferred embodiment of the invention and what is now considered to be the best mode of practicing the principles thereof.

In the drawing:

FIGURE 1 is a top plan view of a flat, disc-like, sheet metal blank from which a unitary wheel may be manufactured in accordance with the method of this invention;

FIGURE 2 is a cross-sectional view of a cup-shaped blank drawn from the flat disc-like blank of FIG. 1;

FIGURE 3 is a cross-sectional view, similar to FIGURE 2, of a blank formed from the cup-shaped blank of FIG. 2 by a reverse draw;

FIGURES 4, 5 and 6 are cross-sectional views of blanks formed from the blank of FIG. 3 by successive first, second and third additional redraws, respectively;

FIGURE 7 is a cross-sectional view of a blank formed from the blank of FIG. 6 by a strike-up operation;

FIGURE 8 is a cross-sectional view of a blank formed from the blank of FIG. 7 by a perforating operation;

FIGURE 9 is a cross-sectional view of a unitary pulley formed from the blank of FIG. 8 by a parting operation; and FIGURE 10 is an enlarged fragmentary cross-sectional view of a modified unitary wheel and tire assembly formed from the blank of FIG. 8, with a flange being provided on the V-groove portion thereof.

Attention is now directed to FIGS. 1–8 of the drawing wherein there is illustrated a preferred embodiment of the improved method of manufacturing a one-piece wheel in the successive steps contemplated; FIG. 9 which illustrates the completed unitary pulley and FIG. 10 which illustrates the completed unitary wheel and tire assembly which are each manufactured according to the method illustrated in FIGS. 1–8. In FIG 1 there is shown a unitary, substantially flat, disc-like blank 10 from which a one-piece V-groove wheel 12 may be manufactured. The disc-like blank 10 may be formed from a sheet or strip of suitable ductile metal stock by blanking, punching or some other conventional cutting operation and preferably is substantially flat on both sides and free from surface deformation. It will also be noted that the disc-like blank 10 is imperforate and will remain so, during most of the subsequent forming operations, for a purpose hereinafter more fully disclosed.

As an initial step, the disc-like blank 10 of FIG. 1, is formed into a cup-shaped blank 14, as shown in FIG. 2, by drawing the radially central portion of the disc-like blank 10 axially a given distance in one direction, indicated by the arrow A, from the remaining portion thereof. The operation may be performed by a conventional cupping press and provides the cup-shaped blank 14 with an imperforate flat base portion 16 and an imperforate generally radially outwardly extending, substantially flat flange portion 18 which is disposed radially outwardly of the centrally disposed flat base portion 16. Further, the flange portion 18 and the base portion 16 are axially offset relative to each other and so positioned in generally radially extending planes that are substantially parallel to each other and joined by an annular generally axially extending wall portion 20.

Thereafter, a radially inner part of the flat base portion 16 of the cup-shaped blank 14 is reverse drawn a distance greater than and in a direction opposite to that of the preceeding draw, as indicated by the arrow B in FIG. 3, so that there is formed a modified cup-shaped blank 22 which is axially reversed to the cup-shaped blank 14 and is provided with a hub portion 24 supported from the radial inner marginal portion of the annular wall portion 20 by a generally axially opening substantially U-shaped portion 26. It is to be noted that the hub portion 24 and the U-shaped portion 26 extend axially substantially equi-distantly to the respective sides of the radial plane common to the flange portion 18, as shown by FIG. 3.

The hub portion 24 is then formed into a generally axially extending substantially cylindrically sleeve portion 28 which terminates in a curved imperforate closed end 30 and the U-shaped portion 26 is concurrently formed into a generally flat annular radially inner disc portion 32 by a series of additional progressive redrawing operations, as illustrated in FIGS. 4, 5 and 6, to form a blank 34, as shown in FIG. 6.

It is to be noted that the closed end 30, the flange portion 18 and the inner disc portion 32 are each disposed in substantially parallel planes with the planes which are common to the closed end 30 and the inner disc portion 32, respectively, being axially spaced substantially equal distances to both sides of the plane that is common to the flange portion 18. In the present instance, these additional redrawing operations are illustrated with the blank 36 obtained after the first additional redraw being shown in FIG. 4 and the blank 38 obtained after the second additional redraw being shown in FIG. 5.

Preferably, the blank 34 is then struck-up in the same general direction as the reverse drawing operation to sharpen the corners between the cylindrical sleeve portion 28 and the inner disc portion 32 and to also form the curved imperforate closed end 30 of the sleeve portion 28 into a substantially flat end portion 42, to define a blank 40, as shown in FIG. 7. The strike-up operation also serves to lengthen the cylindrical sleeve portion 28 in an axial direction which gives added stability to the wheel but it is to be noted that the inner disc portion 32 and the imperforate end portion 42 are each disposed in planes that are parallel to and substantially equally axially spaced from the radial plane common to the flange portion 18.

The flat end portion 42 is thereafter removed from the cylindrical sleeve portion 28 by a suitable perforating operation to provide a bore 44 therethrough for positioning and retaining the completed wheel to a shaft or the like, not illustrated, with the blank 46 resulting from this operation being shown in FIG. 8. It has been found that by maintaining the sleeve portion 28 imperforate up to this operation that the shape and dimension of the bore 44 may be more closely controlled and a given tolerance maintained than would be the case if the blanks were previously perforated because there will be a definite unpredictable tendency for the metal which surrounds such perforation to stretch or shrink during the drawing, reverse drawing, additional redrawing and strike-up operations.

To complete the one-piece wheel 12, the radial outer annular peripheral marginal edge portion 50 of the flange portion 18 is provided with a generally radially outwardly opening V-groove 52 by an operation, such as parting along the radial plane that is common to the flange portion 18, and the parted portions 54—54 are flared axially away from each other to provide the annular V-groove 52 therein.

Referring now to FIG. 9 wherein the wheel 12 is illustrated in completed form as a unitary one-piece pulley 56 with the V-groove 52 being adapted to receive a V-belt or the like, not illustrated, and FIG. 10 wherein the wheel 12 is illustrated as a unitary one-piece wheel 58 having an annular resilient tire 60 secured in the V-groove 52 it will be particularly noted that the sleeve portion 28 of the pulley 56 and the wheel 58 extends axially beyond the radial plane of the respective V-groove 52 and has substantially equally axially extending portions 62—62 disposed axially to both sides thereof. This specific axial disposition of the sleeve portion 28 together with the close control of the material thereof which surrounds and defines the size and shape of the bore 44 gives a definite, desired improved lateral stability to the pulley 56 and the wheel 58, when mounted on a shaft, in comparison to similar prior art constructions.

If desired, the pulley 56, FIG. 9, and the wheel 58, FIG. 10, may have the respective V-grooves 52 formed with the parted portions 54—54 defining generally axially extending annular peripheral flanges 64—64 by an operation, such as rolling, after the edge portion 59 thereof has been parted, as described above. For the sake of brevity, the pulley 56 has been illustrated without such flanges 64—64 and the wheel 58 has been illustrated with such flanges, but it is to be understood that both of the wheels 56 and 58 may be formed with or without the flanges 64—64. By providing the wheel with the flanges 64—64 there is provided an increase in the strength of the V-groove 52, an increase in the lateral stability of the entire wheel and an increase in the surface contact of the V-groove with either the V-belt, not illustrated, or the tire 60.

It is contemplated that any suitable means may be used in performing the various operations described above. For the sake of brevity, since such means will be apparent to those skilled in the art, and since they form no part of the present invention, no illustrations thereof have been made.

While the invention has been described in terms and operational steps of an embodiment which it has assumed in practice, the scope of the invention should not be deemed to be limited by the precise embodiment herein illustrated and described, such other embodiments being intended to be reserved especially as they fall within the scope of the claims here appended.

We claim:

1. A method of manufacturing a one-piece wheel having a hub portion formed integral therewith, said method comprising the steps of drawing a central portion of a blank away from the remaining portion thereof, reverse drawing a part of the central portion toward and beyond the remaining portion of the blank with the part of the central portion extending substantially equally to both sides of a plane disposed common to the remaining portion of the blank to define the said hub portion of the wheel, perforating the central portion of the blank to provide a bore for the hub portion, and parting the remaining portion of the blank to form a groove in the periphery thereof.

2. A method of manufacturing a one-piece wheel having a generally axially extending hub portion formed integral therewith, said method comprising the steps of drawing a central portion of a blank generally axially away from the remaining portion thereof, reverse drawing a part of the central portion generally axially toward and beyond the remaining portion of the blank with the part of the central portion extending axially substantially equally to both sides of a generally radial plane disposed common to the remaining portion of the blank to define the said hub portion of the wheel, perforating the central portion of the blank to provide a bore for the hub portion and parting the remaining portion of the blank along the said radial plane to provide a generally outwardly opening annular V-groove therein.

3. A method of manufacturing a one-piece wheel and tire assembly, said method comprising the steps of drawing a central portion of a disc-like blank generally axially away from the remaining portion thereof, reverse drawing an imperforate part of the central portion generally axially toward and beyond the remaining portion of the blank with the part of the central portion extending axially substantially equally to both side of a generally radial plane disposed common to the remaining portion of the blank to define a generally axially extending hub portion formed integral with the wheel, perforating the central portion of the blank to provide a bore for the hub portion, parting the remaining portion of the blank to form a V-groove in the periphery thereof to complete the one-piece wheel, and thereafter securing an annular resilient tire to the V-groove to complete the one-piece wheel and tire assembly.

4. A method of manufacturing a one-piece wheel having a hub portion formed integral therewith, said method comprising the steps of drawing a central portion of a disc-like blank away from the remaining portion thereof, reverse drawing an imperforate part of the central portion toward and beyond the remaining portion of the blank with the part of the central portion extending a substantial distance equal to both sides of the remaining portion to define the said hub portion of the wheel, perforating the central portion of the blank to provide a bore therethrough, and parting the remaining portion of the blank to form a generally outwardly opening annular groove therein.

5. The method of fabricating a one-piece pulley from a disc-like blank, said method comprising the steps of drawing a portion of the disc-like blank a given distance in one generally axially extending direction relative to the remaining portion thereof to define a cup-shaped blank having a base portion and a flange portion, reverse drawing an imperforate part of the base portion in another generally axially extending direction that is substantially opposed to the said one direction a distance that is at least twice the said given distance to define a generally axially extending hub portion having one end thereof closed, perforating the closed end of the hub portion to provide a generally axially extending bore therethrough, and parting the remaining portion of the blank to form a generally outwardly opening annular groove in the periphery thereof.

6. The method of forming a one-piece V-groove wheel from a blank comprising the steps of drawing a central portion of said blank in one direction a given distance from the remaining portion thereof, reverse drawing an imperforate part of said central portion in a direction that is generally opposite to the said one direction a distance greater than said given distance to define an imperforate hub portion extending substantially equal distances to both sides of the remaining portion, perforating said hub portion to provide a bore therethrough, and parting the remaining portion of the blank to form a V-groove in the peripheral margin thereof to complete the one-piece V-groove wheel.

7. The method of fabricating an integral V-groove wheel from a disc-like blank comprising the steps of drawing said disc-like blank into a generally cup-shaped blank having a substantially flat base portion and a flange portion axially spaced therefrom by a generally axially extending wall portion, reverse drawing a part of said base portion toward and beyond a radially disposed plane common to said flange portion to form a hub portion extending substantially equal distances to both sides of the radial plane of said flange portion with the hub portion being connected to said wall portion by a generally U-shaped annular portion, progressively redrawing said hub portion to concurrently form the hub portion into a generally axially extending imperforate sleeve portion and the U-shaped portion into a substantially flat disc portion, perforating the sleeve portion to provide a generally axially extending bore therethrough, and parting the flange portion to form a V-groove in the peripheral margin thereof to complete the integral V-groove wheel.

8. The method of fabricating an integral V-groove wheel from a disc-like blank comprising the steps of drawing said disc-like blank into a generally cup-shaped blank having a substantially flat base portion and a radially extending flange portion axially spaced in one direction therefrom by a generally axially extending wall portion, reverse drawing a part of said base portion in an axial direction opposite to the said one direction toward and beyond a radial plane common to the said flange portion to form a hub portion extending substantially equal distances to both sides of the radial plane of said flange portion with the hub portion being connected to said wall portion by a generally U-shaped annular portion, progressively redrawing the hub portion to concurrently form the hub portion into a generally axially extending substantially cylindrical sleeve portion having a closed end portion and the U-shaped portion into a substantially flat disc portion, striking said sleeve portion to provide relatively sharp corners between the sleeve portion and said disc portion, perforating the closed end portion of the sleeve portion to provide a generally axially extending bore therethrough, parting the peripheral margin of said flange portion along the said radial plane to provide a pair of axially spaced generally radially extending portions which define a generally outwardly opening V-groove, and thereafter forming the peripheral edge portion of each of said generally radially extending portions into a generally axially extending peripheral flange to complete the integral V-groove wheel.

9. A method of manufacturing a one-piece wheel having a hub portion formed integral therewith, said method comprising the steps of drawing a central portion of a blank away from the remaining portion thereof, reverse drawing a part of the central portion toward and beyond the remaining portion of the blank with the part of the central portion extending substantially equally to both sides of the remaining portion of the blank to define the hub portion of the wheel, and parting the remaining portion of the blank to form a groove in the periphery thereof.

10. A method of manufacturing a one-piece wheel having a hub portion formed integral therewith, said method comprising the steps of drawing a central portion of a blank away from the remaining portion thereof, reverse drawing an imperforate part of the central portion away from the remaining portion of the central portion with the imperforate part of the central portion extending a substantial distance equally to both sides of the remaining portion of the blank to define the hub portion of the wheel, and parting the remaining portion of the blank to form a generally outwardly opening annular groove therein.

11. A method of manufacturing a one-piece wheel having a hub portion formed integral therewith, said method comprising the steps of drawing a central portion of a disc-like blank generally axially away from the remaining portion, reverse drawing a part of the central portion generally axially toward and beyond the remaining portion of the blank with the part of the central portion extending substantially equally to both sides of a plane disposed common to the remaining portion of the blank to define the hub portion of the wheel, and parting the remaining portion of the blank to form a generally outwardly opening annular groove in the periphery thereof.

References Cited in the file of this patent

UNITED STATES PATENTS

| 344,459 | Paul et al. | June 29, 1886 |
| 1,494,410 | Bidle | May 20, 1924 |
| 1,506,435 | Martin | Aug. 26, 1924 |
| 1,555,771 | Stenz | Sept. 29, 1925 |
| 1,700,416 | Nelson | Jan. 29, 1929 |

(Other references on following page)

UNITED STATES PATENTS

| | | |
|---|---|---|
| 1,728,002 | Nelson | Sept. 10, 1929 |
| 1,774,660 | Nelson | Sept. 2, 1930 |
| 1,952,338 | Sinclair | Mar. 27, 1934 |
| 2,006,281 | Schwarz | June 25, 1935 |
| 2,008,300 | Feldbush | July 16, 1935 |
| 2,220,284 | Roemer | Nov. 5, 1940 |
| 2,279,816 | Eppler | Apr. 14, 1942 |
| 2,493,053 | Zatyko | Jan. 3, 1950 |

FOREIGN PATENTS

| | | |
|---|---|---|
| 6,161 | Great Britain | of 1892 |
| 284,545 | Great Britain | Feb. 2, 1928 |
| 517,347 | Great Britain | Jan. 26, 1940 |
| 625,768 | Great Britain | July 4, 1949 |